(12) United States Patent
Albero et al.

(10) Patent No.: US 12,489,811 B1
(45) Date of Patent: Dec. 2, 2025

(54) PEER-TO-PEER NETWORK TRANSMISSION VERIFICATION SYSTEM

(71) Applicant: BANK OF AMERICA CORPORATION, Charlotte, NC (US)

(72) Inventors: George Albero, Charlotte, NC (US); Jeffrey Felipe, Waxhaw, NC (US); Kathleen Rae Hablutzel, Pittsboro, NC (US); Jinna Kim, Charlotte, NC (US); Olga Kocharyan, Matthews, NC (US); Karen MacQueen, Lyndhurst, OH (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/733,245

(22) Filed: Jun. 4, 2024

(51) Int. Cl.
*H04L 67/1074* (2022.01)
*H04L 67/1087* (2022.01)

(52) U.S. Cl.
CPC ...... *H04L 67/1076* (2013.01); *H04L 67/1085* (2013.01); *H04L 67/1093* (2013.01)

(58) Field of Classification Search
CPC ... H04L 67/1091; H04L 67/568; H04L 67/10; H04L 67/06; H04L 67/108; H04L 67/1063; H04L 67/1085; H04L 67/1093; H04L 67/1076; H04L 67/104
See application file for complete search history.

(56) References Cited

U.S. PATENT DOCUMENTS

| | | | |
|---|---|---|---|
| 6,880,100 B2 | 4/2005 | Mora | |
| 7,127,613 B2 * | 10/2006 | Pabla | H04L 9/0891 380/278 |
| 7,548,758 B2 * | 6/2009 | Periyalwar | H04L 67/104 370/324 |
| 7,783,749 B2 | 8/2010 | Hopkins | |
| 7,900,082 B2 | 3/2011 | Strauss | |
| 8,032,652 B2 * | 10/2011 | Iyer | H04L 67/1074 709/234 |
| 8,762,542 B2 | 6/2014 | Pennington | |

(Continued)

*Primary Examiner* — Ninos Donabed
(74) *Attorney, Agent, or Firm* — Moore & Van Allen PLLC; Anup Iyer

(57) ABSTRACT

Verification of peer-to-peer network transmission occurs implementing AI to determine a match between the purpose/intent of the peer-to-peer network transmission as defined by the sending entity/peer and the purpose/intent of the peer-to-peer network transmission as defined by the recipient entity/peer. The sending peer initiates communication of a peer-to-peer network transmission, which identifies the recipient peer and purpose of the transmission. The peer-to-peer network transmission is captured and held in a transmission pending queue. A push notification is communicated to the recipient entity/peer identified in the transmission, which requests input of their perceived purpose/intent of the transmission. Once the recipient entity/peer identified in the transmission responds with their purpose of the transmission, an AI model trained to determined matches between inputted purposes/intents is executed. Once the AI model determines a purpose/intent match, the transmission is released for the transmission pending queue, so that further communication and/or processing of the transmission occurs.

16 Claims, 5 Drawing Sheets

(56) References Cited

U.S. PATENT DOCUMENTS

| | | | |
|---|---|---|---|
| 8,842,696 B1* | 9/2014 | Usmani | G06F 13/28 |
| | | | 710/107 |
| 8,943,236 B1* | 1/2015 | Usmani | H04L 12/6418 |
| | | | 710/21 |
| 8,990,422 B1* | 3/2015 | Usmani | H04L 49/9042 |
| | | | 711/208 |
| 9,635,106 B2 | 4/2017 | Lakshmegowda | |
| 9,729,428 B2 | 8/2017 | Wang | |
| 11,310,236 B2 | 4/2022 | Rakshit | |
| 11,503,041 B2 | 11/2022 | Maxwell | |
| 11,716,625 B2* | 8/2023 | Ozanian | H04W 12/06 |
| 12,095,779 B2 | 9/2024 | Ling | |
| 2002/0045956 A1* | 4/2002 | Kapitan | G05B 19/414 |
| | | | 709/208 |
| 2004/0034776 A1* | 2/2004 | Fernando | H04L 9/321 |
| | | | 713/171 |
| 2005/0080858 A1 | 4/2005 | Pessach | |
| 2005/0267990 A1* | 12/2005 | Andersen | H04L 67/104 |
| | | | 709/245 |
| 2006/0090202 A1* | 4/2006 | Liu | H04L 63/101 |
| | | | 726/17 |
| 2008/0072037 A1 | 3/2008 | Narayanan | |
| 2008/0244077 A1 | 10/2008 | Canosa | |
| 2009/0271502 A1* | 10/2009 | Xue | H04L 67/104 |
| | | | 709/219 |
| 2011/0029660 A1 | 2/2011 | Hopkins | |
| 2013/0326494 A1* | 12/2013 | Nunez | H04L 41/082 |
| | | | 717/172 |
| 2014/0258415 A1 | 9/2014 | L'Heureux et al. | |
| 2015/0058876 A1* | 2/2015 | Gasnier | H04N 21/632 |
| | | | 725/16 |
| 2016/0284020 A1 | 9/2016 | Williams | |
| 2017/0208034 A1 | 7/2017 | Rostami-Hesarsorkh | |
| 2017/0310747 A1 | 10/2017 | Cohn | |
| 2018/0287878 A1 | 10/2018 | Jarnikov | |
| 2020/0022129 A1* | 1/2020 | Dunne | H04L 67/1074 |
| 2020/0042725 A1* | 2/2020 | Bolkhovitin | G06F 21/64 |
| 2020/0043047 A1* | 2/2020 | Walton | G06Q 20/3226 |
| 2020/0053619 A1* | 2/2020 | Sartori | H04W 8/08 |
| 2020/0076889 A1 | 3/2020 | Shankar Iyer | |
| 2022/0317855 A1* | 10/2022 | Zhu | G06F 3/0412 |
| 2024/0114552 A1* | 4/2024 | Kim | H04W 74/0816 |
| 2024/0430175 A1 | 12/2024 | Chen | |

\* cited by examiner

PEER-TO-PEER NETWORK TRANSMISSION VERIFICATION SYSTEM

FIELD OF THE INVENTION

The present invention is generally directed to peer-to-peer network transmissions and, more specifically, a system that provides for the receiving entity in control of the peer node receiving the benefit of peer-to-peer network transmission to verify that they are the intended receiving entity through use of an AI model that serves to match the receiving entity' s and the sending entity's transmission purpose/intent.

BACKGROUND

Peer-to-peer network is a decentralized communication model where each participant, commonly referred to as a peer, in the network can both as a client and a server. In this type of network, peers share resources directly with each without the need for a central coordinating server. A peer-to-peer network enable sharing of files, data or resources among multiple users and devices (i.e., peer nodes or the like) in a distributed manner. The decentralization of the network means that each peer in the network has equal status and can initiate or receive transmissions. Since peers directly interact and communicate with each other, efficient resource sharing and data transfer can be realized. Moreover, peer-to-peer networks are easily scalable as more peers join the network and is generally more robust and resistant to failures, since loss of a single peer does not disrupt the entire network.

Specific types of peer-to-peer network transmissions allow for resources to be directly transferred from one peer to another peer. Such transmissions/transfers occur efficiently, often in real-time. However, generally such transmissions/transfers offer the sending entity very little in terms of recourse if the transmission/transfer occurs in error. For example, if the sending entity/peer communicates the peer-to-peer network transmission to the wrong/unintended recipient entity/peer, no recourse exists to recover the resources or the benefit realized in the transmission.

Therefore, a need exists to develop systems, computerized methods and the like that provide for a means by which the peer-to-peer network transmissions are not absolute upon communication. In other words, a need exists whereby the sending entity/peer in a peer-to-peer network transmission can be assured that the transmission and/or resources be transferred are, in fact, be communicated/transferred to the sending entity's/peer's intended recipient entity/peer.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for a system that affords the ability of verifying that the recipient entity/peer in a peer-to-peer network transmission is, in fact, the sending entity's/peer's intended recipient entity/peer. Verification occurs by implementing a process whereby the purpose/intent of the peer-to-peer network transmission as defined by the sending entity/peer must match the purpose/intent of the peer-to-peer network transmission as defined by the recipient entity/peer in order for the transmission to go through (i.e., process, such that, the recipient entity/peer receives the benefit of the transmission (e.g., resource exchange or the like)). In this regard, the verification system of the present invention operates under the assumption that when a sending peer sends a transmission the recipient peer knows, ahead of time, the purpose/intent of the transmission (i.e., the purpose/intent of the benefit realized by the peer-t-o-peer network transmission).

Specifically, the sending entity/peer initiates communication of a peer-to-peer network transmission, which identifies, among other parameters, the recipient entity/peer and purpose/intent of the transmission. The peer-to-peer network transmission is captured and held in a transmission pending queue until the recipient entity/peer can verify that they are the intended recipient of the transmission. In this regard, a push notification is communicated to the recipient entity/peer identified in the transmission, which requests input of their perceived purpose/intent of the transmission. Once the recipient entity/peer identified in the transmission responds with their purpose/intent of the transmission an Artificial Intelligence (AI) model trained to determined matches between inputted purposes/intents is executed to determine whether the sending peer's purpose/intent of the transmission matches the recipient peer's purpose intent. In the event that the AI model determines a purpose/intent match, the transmission is released for the transmission pending queue, so that further communication and/or processing of the transmission occurs (i.e., the recipient receives the benefit of the transmission, such as resource exchange or the like).

In conventional peer-to-peer network transmissions the sending peer often represents the purpose/intent of a transmission with symbol(s) (e.g., emojis or the like), video file, avatar(s), audio file(s), multimedia file(s), personal identifying data and the like, as well as various combinations of text and one or more of the aforementioned. Thus, in specific embodiments of the invention, the AI model is trained to determine matches between inputted purposes/intents, which may be represented by text, symbols, video file, avatar(s), audio file(s), multimedia file(s), personal identifying data and the like (i.e., the AI model can determine matches based on any combination of inputs including, but not limited to, text, symbol, video file, avatar(s), audio file(s), multimedia file(s), personal identifying data and the like).

In specific embodiments of the invention, in the event that the AI model does not determine a purpose/intent match, the transmission may be deleted/dropped from the transmission pending queue and a notification sent to the sending peer indicating the failure of the transmission. In other embodiments of the invention, in the event that the AI model does not determine a purpose/intent match, a secondary/back-up verification process may be implemented, such as verification through generation and presentation of a unique one-time verification code or the like.

In further specific embodiments of the invention, in addition to recipient peer verification, the sending peer's defined intent/purpose and, in some embodiments, the controlling party/user of the sending and/or recipient peer may be used for other objectives. For example, further AI models may be implemented that are trained to detect potential misappropriation as a result of the transmission based on the sending peer's defined intent/purpose and, in some embodiments, the controlling party/user of the sending and/or recipient peer. In specific embodiments of the invention, such AI models may be implemented while the transmission is held in the transmission pending queue, such that detection of potential misappropriation results in either (i) maintaining the transmission in the queue (even if verification has occurred) until further investigation can occur to confirm/deny the misappropriation or (ii) deleting/dropping the transmission from the transmission pending queue. In another example, further AI models may be implemented that are trained to detect alternative recommendations to sending the transmission (e.g., other ways the benefit of the transmission can be realized) based on the sending peer's defined intent/purpose and, in some embodiments, the controlling party/user of the sending and/or recipient peer. In specific embodiments of the invention, such AI models may be implemented while the transmission is held in the transmission pending queue, such that identification of alternative recommendations results in notification of the sending peer of the alternative recommendations for purposes of allowing the sending peer the option to revoke the transmission and proceed with one of the alternative recommendations.

A system for verifying a peer-to-peer network transmission defines first embodiments of the invention. The system includes a peer-to-peer network comprising a plurality of peer nodes. The system further includes a computing platform having a memory and one or more computing processor devices in communication with the memory. The memory stores a peer-to-peer network transmission verification sub-system including a first Artificial Intelligence (AI) model.

The peer-to-peer network transmission verification sub-system is executable by at least one of the one or more computing processor devices and configured to receive, from a first peer node from amongst the plurality of peer nodes, a peer-to-peer network transmission. The peer-to-peer network transmission includes (i) a second peer node identifier associated with a second peer node from amongst the plurality of peer nodes and (ii) a first transmission purpose/intent. In response to receiving the peer-to-peer network transmission, the sub-system is further configured to hold the peer-to-peer network transmission in a pending transmission queue. While the peer-to-peer network transmission is held in the pending transmission queue, the sub-system is configured to (i) initiate communication of a first push notification, to the second peer node, which is configured to request input of a second transmission purpose, (ii) receive, from the second peer node, a response to the first push notification that includes the second transmission purpose, and (iii) execute the first AI model that is trained to determine whether the first transmission purpose matches the second transmission purpose. In response to the first AI model determining that the first transmission purpose matches the second transmission purpose, the sub-system is configured to release the peer-to-peer network transmission from the pending transmission queue, such that the transmission is authorized for further processing.

In specific embodiments of the system, at least one of the first transmission purpose and the second transmission purpose are represented within the corresponding peer-to-peer network transmission or response by one or more non-textual representations (e.g., symbols/emojis, images, video files, avatars, audio files, multimedia files, personal identifying data and the like). In related embodiments of the system, the first AI model is trained to determine at least one of (i) whether the first transmission purpose represented by the one or more non-textual representations matches the second transmission purpose represented by text, (ii) whether the first transmission purpose represented by text matches the second transmission purpose represented by the one or more non-textual representations and (iii) whether the whether the first transmission purpose represented by the one or more non-textual representations matches the second transmission purpose represented by the one or more non-textual representations.

In other specific embodiments of the system, the peer-to-peer network transmission is further defined as a peer-to-peer network resource exchange between a resource provider in control of the first peer node and a resource receiver in control of the second peer node.

In still further specific embodiments of the system, the peer-to-peer network transmission verification sub-system is further configured to, in response to the first AI model determining that the first transmission purpose does not match the second transmission purpose, delete, or otherwise drop the peer-to-peer network transmission from the pending transmission queue. In related embodiments of the system, the peer-to-peer network transmission verification sub-system is further configured to initiate communication of a second push notification, to the first peer node, which is configured to notify the first peer node of peer-to-peer network transmission failure. In alternate embodiments of the system, the peer-to-peer network transmission verification sub-system is further configured to, in response to the first AI model determining that the first transmission purpose does not match the second transmission purpose, generate and store a verification code and initiate communication of (i) a second push notification to the second peer node that includes the verification code, and (ii) a third push notification, to the second peer node, which is configured to request input of the verification code. In response, the sub-system is configured to receive, from the second peer node, a response to the third push notification that includes an inputted verification code and determine whether the stored verification code matches the inputted verification code. In response to determining that the stored verification code matches the inputted verification code, the sub-system is configured to release the peer-to-peer network transmission from the pending transmission queue for further transmission processing.

In other specific embodiments of the system, the memory further stores a misappropriation detection sub-system, which includes a second AI model, and is executable by at least one of the one or more computing processor devices. The misappropriation detection sub-system is configured to receive, from the peer-to-peer network transmission verification sub-system, a first notification that indicates that the peer-to-peer network transmission is being held in the pending transmission. The first notification includes the first transmission purpose and, in some embodiments of the system, identifies the first peer node and/or the second peer node (or controlling entity(s)). The misappropriation detection sub-system is configured to execute the second AI model that is trained to determine a potential misappropriation associated with the peer-to-peer network transmission based at least on the first transmission purpose and, in specific embodiments based further on the first and/or second peer nodes (or controlling entity(s)). In response to determining the potential misappropriation, the misappropriation detection sub-system is further configured to initiate communication of second notification, to the peer-to-peer network transmission verification sub-system, which is configured to indicate a potential misappropriation associated with the peer-to-peer network transmission.

Moreover, in further specific embodiments of the system, the memory further stores an alternative recommendation sub-system, which includes a second AI, and is executable by at least one of the one or more computing processor devices model. The alternative recommendation sub-system is configured to receive, from the peer-to-peer network transmission verification sub-system, a first notification that indicates that the peer-to-peer network transmission is being held in the pending transmission and includes the first transmission purpose. In response, alternative recommendation sub-system is configured to implement the second AI model that is trained to determine one or more recommendations for alternatively accomplishing the first transmission purpose absent the peer-to-peer network transmission. In response to determining the one or more recommendations, the alternative recommendation sub-system is configured to initiate communication of a second notification, to the first peer node, which is configured to indicate the one or more recommendations.

A computer-implemented method for verifying a peer-to-peer network transmission defines second embodiments of the invention. The method includes receiving, from a first peer node from amongst a plurality of peer nodes in a peer-to-peer network, a peer-to-peer network transmission, which includes (i) a second peer node identifier associated with a second peer node from amongst the plurality of peer nodes and (ii) a first transmission purpose/intent. In response to receiving the transmission, the method includes holding the peer-to-peer network transmission in a pending transmission queue. While the peer-to-peer network transmission is held in the pending transmission queue, the method further includes (i) initiating communication of a first push notification, to the second peer node, which is configured to request input of a second transmission purpose, (ii) receiving, from the second peer node, a response to the first push notification that includes the second transmission purpose, and (iii) executing a first AI model that is trained to determine whether the first transmission purpose matches the second transmission purpose. In response to the first AI model determining that the first transmission purpose matches the second transmission purpose, releasing the peer-to-peer network transmission from the pending transmission queue, such that further processing of the transmission can occur.

In specific embodiments of the computer-implemented method, at least one (i) the first transmission purpose is represented in the peer-to-peer network transmission by one or more non-textual representations, and (ii) the second transmission purpose is represented in the response by one or more non-textual representations. In related embodiments of the computer-implemented method, executing the first AI model that is trained to determine whether the first transmission purpose matches the second transmission purpose further includes executing the first AI model that is trained to determine one of (i) whether the first transmission purpose represented by the one or more non-textual representations matches the second transmission purpose represented by text, (ii) whether the first transmission purpose represented by text matches the second transmission purpose represented by the one or more non-textual representations, and (iii) whether the whether the first transmission purpose represented by the one or more non-textual representations matches the second transmission purpose represented by the one or more non-textual representations.

In further specific embodiments, the computer-implemented method includes, in response to the first AI model determining that the first transmission purpose does not match the second transmission purpose, generating and storing a verification code and initiating communication of (i) a second push notification to the second peer node that includes the verification code and (ii) a third push notification, to the second peer node, which is configured to request input of the verification code. The method further includes receiving, from the second peer node, a response to the third push notification that includes an inputted verification code and determining whether the stored verification code matches the inputted verification code. In response to determining that the stored verification code matches the inputted verification code, the computer-implemented method includes releasing the peer-to-peer network transmission from the pending transmission queue, such that further processing of the transmission can occur.

In additional specific embodiments, the computer-implemented method further includes executing a second AI model that is trained to determine a potential misappropriation associated with the peer-to-peer network transmission based on the first transmission purpose. In response to determining the potential misappropriation, the method includes maintaining the peer-to-peer network transmission in the pending transmission queue or deleting the peer-to-peer network transmission from the pending transmission queue.

A computer program product including a non-transitory computer-readable medium defines third embodiments of the invention. The computer-readable medium includes sets of codes for causing one or more computing devices to receive, from a first peer node from amongst a plurality of peer nodes in a peer-to-peer network, a peer-to-peer network transmission. The peer-to-peer network transmission includes (i) a second peer node identifier associated with a second peer node from amongst the plurality of peer nodes and (ii) a first transmission purpose. In response to receiving the transmission, the sets of code further cause the computing device(s) to hold the peer-to-peer network transmission in a pending transmission queue. While the peer-to-peer network transmission is held in the pending transmission queue, the sets of code further cause the computing device(s) to (i) initiate communication of a first push notification, to the second peer node, which is configured to request input of a second transmission purpose, (ii) receive, from the second peer node, a response to the first push notification that includes the second transmission purpose, and (iii) execute a first AI model that is trained to determine whether the first transmission purpose matches the second transmission purpose. In response to the first AI model determining that the first transmission purpose matches the second transmission purpose, the sets of codes are further cause the computing device(s) to release the peer-to-peer network transmission from the pending transmission queue.

In specific embodiments of the computer program product, at least one of (i) the peer-to-peer network transmission includes the first transmission purpose represented in the peer-to-peer network transmission by one or more non-textual representations, and the response to the first push notification includes the second transmission purpose represented in the response by one or more non-textual representations. In related embodiments of the computer program product, the set of codes for executing the first AI model are further configured to cause the one or more computing devices to execute the first AI model that is trained to determine one of (i) whether the first transmission purpose represented by the one or more non-textual representations matches the second transmission purpose represented by text, (ii) whether the first transmission purpose represented by text matches the second transmission purpose represented by the one or more non-textual representations and (iii) whether the whether the first transmission purpose represented by the one or more non-textual representations matches the second transmission purpose represented by the one or more non-textual representations.

In further specific embodiments of the computer program product, the sets of codes further include sets of codes for causing the one or more computing device to in response to the first AI model determining that the first transmission purpose does not match the second transmission purpose, generate and store a verification code and initiate communication of (i) a second push notification to the second peer node that includes the verification code, and (ii) initiate communication of a third push notification, to the second peer node, which is configured to request input of the verification code. In response, the sets of codes further cause the computing device(s) to receive, from the second peer node, a response to the third push notification that includes an inputted verification code and determine whether the stored verification code matches the inputted verification code. In response to determining that the stored verification code matches the inputted verification code, the sets of codes further cause the computing device(s) to release the peer-to-peer network transmission from the pending transmission queue.

In still further specific embodiments of the product, the sets of codes further include sets of codes for causing the one or more computing device to execute a second AI model that is trained to determine a potential misappropriation associated with the peer-to-peer network transmission based on the first transmission purpose and, in response to determining the potential misappropriation, maintain the peer-to-peer network transmission in the pending transmission queue or delete the peer-to-peer network transmission from the pending transmission queue.

Thus, according to embodiments of the invention, which will be discussed in greater detail below, the present invention addresses needs and/or achieves other advantages by verifying that the recipient peer node, as defined by the sending peer node, is, in fact, the intended recipient of the transmission and/or the benefit of the transmission. Verification occurs by implementing a process whereby the purpose/intent of the peer-to-peer network transmission as defined by the sending entity/peer must match the purpose/intent of the peer-to-peer network transmission as defined by the recipient entity/peer in order for the transmission to be released from a pending queue, such that further processing can ensue.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
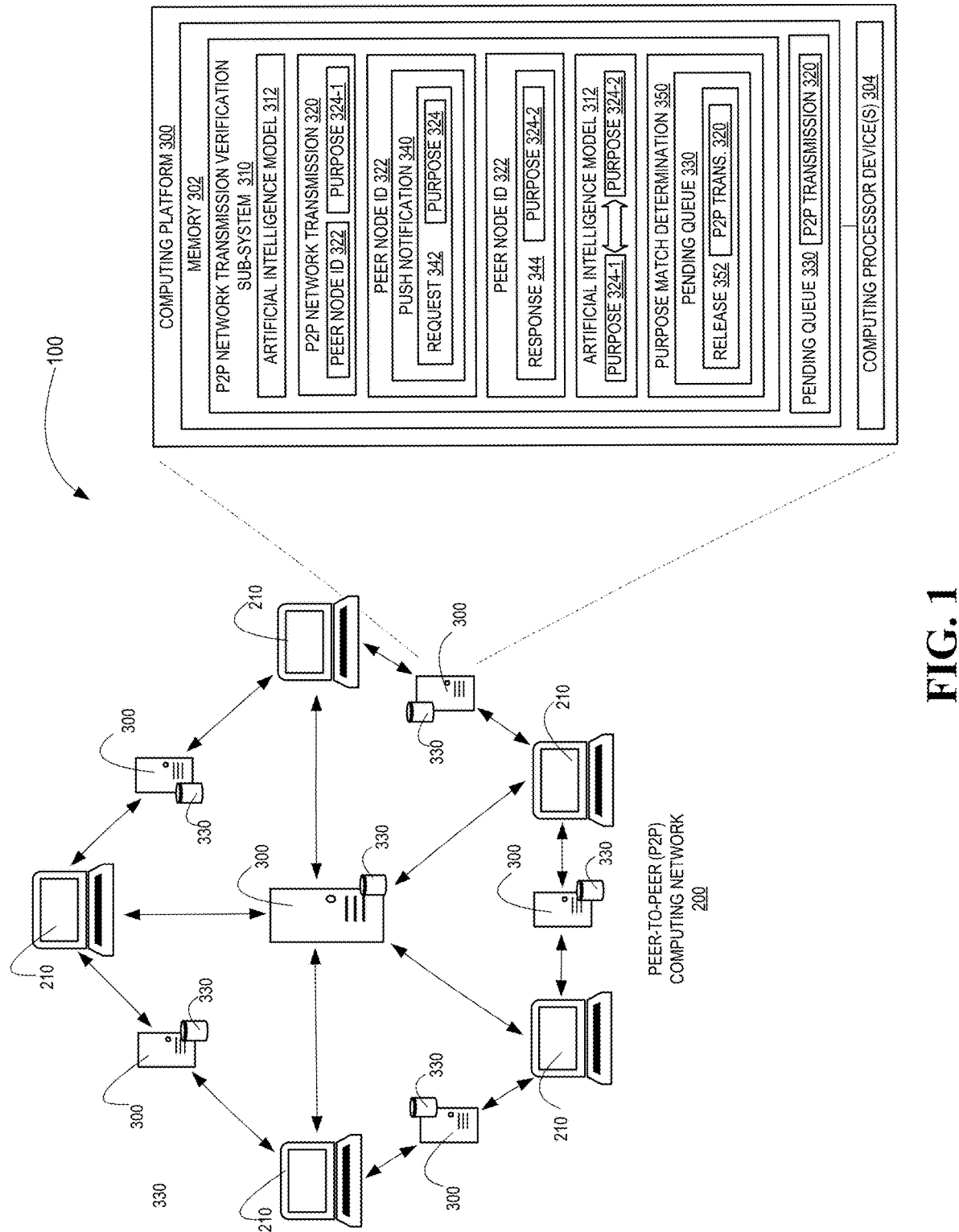
Figure 2:
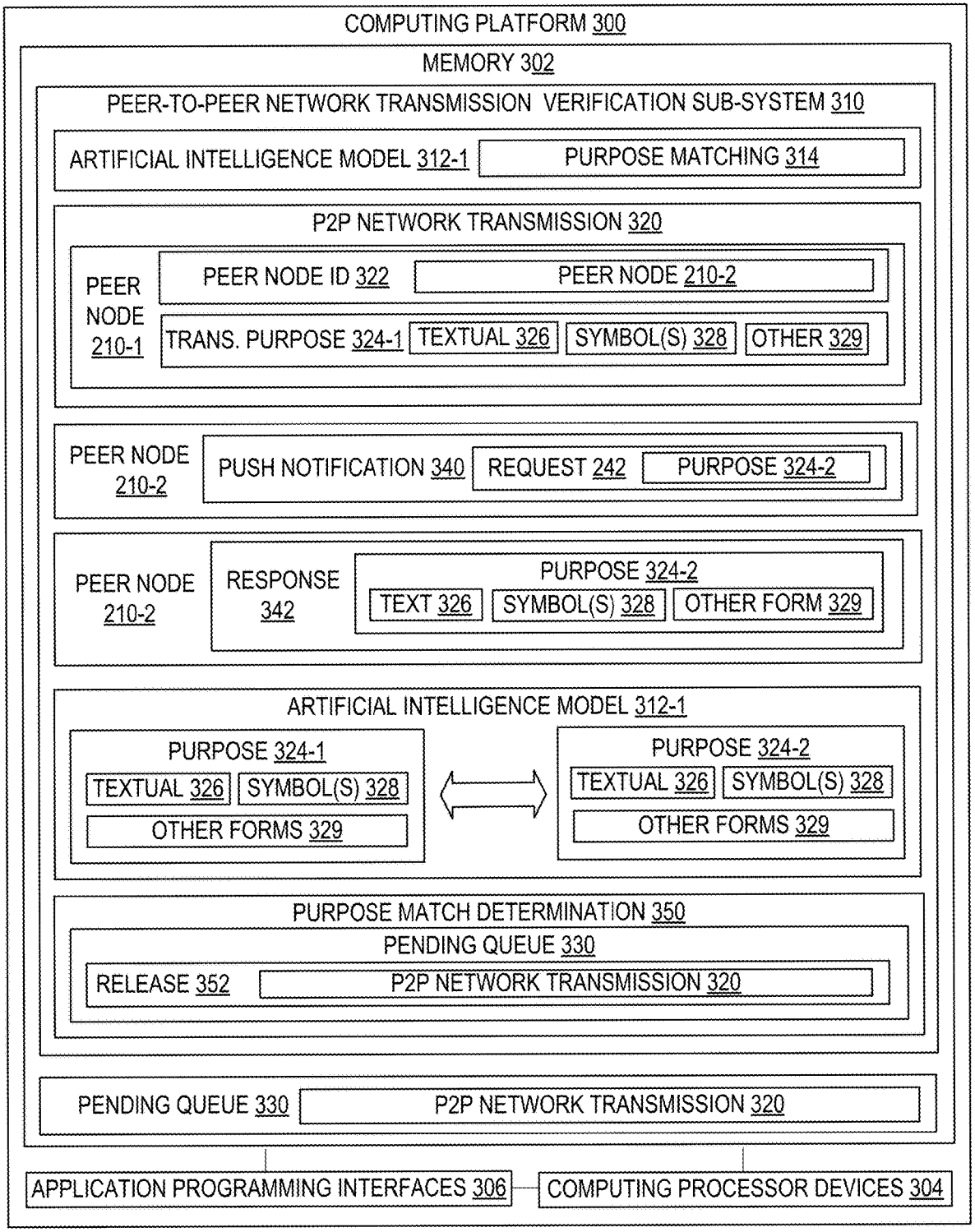
Figure 3:
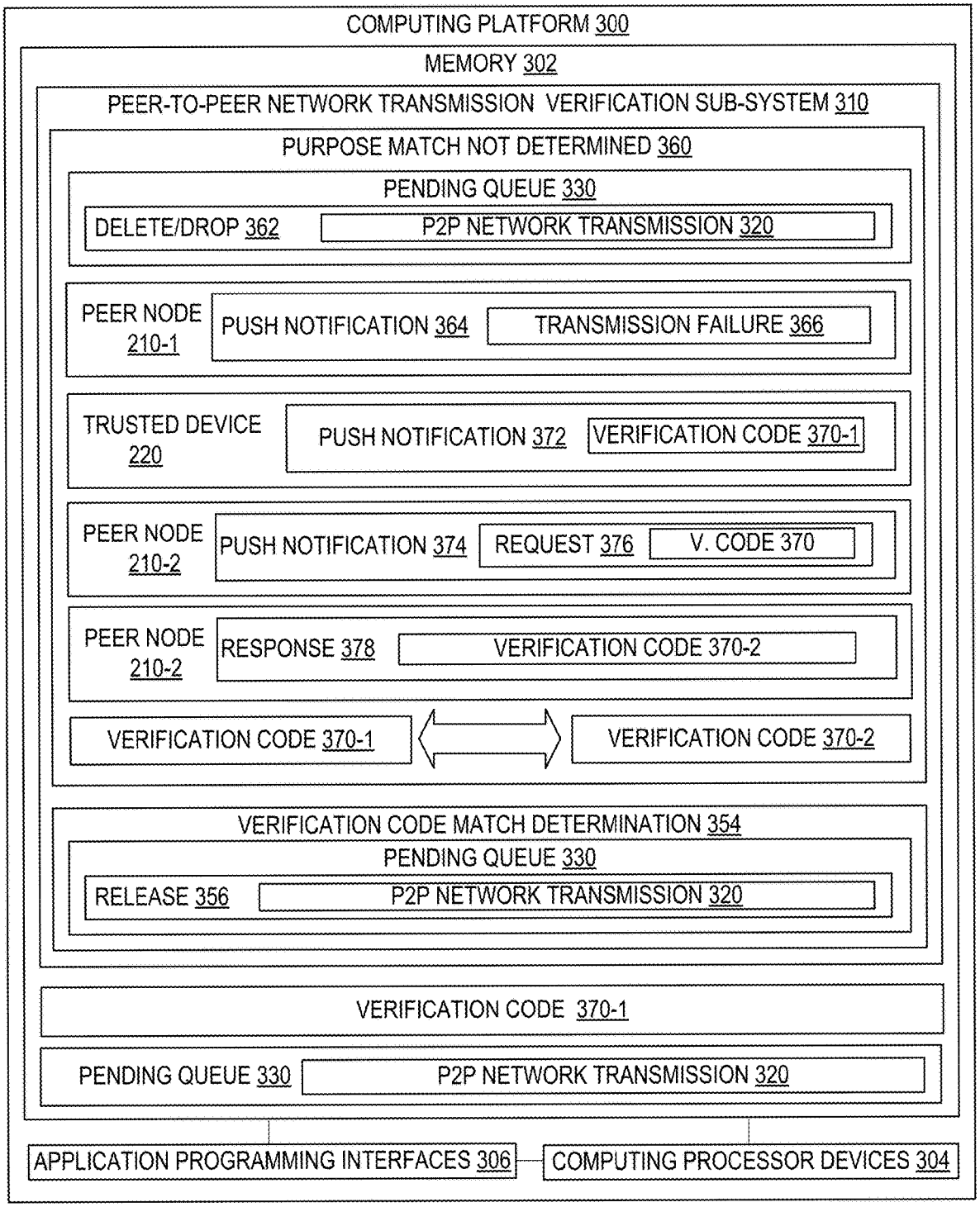
Figure 4:
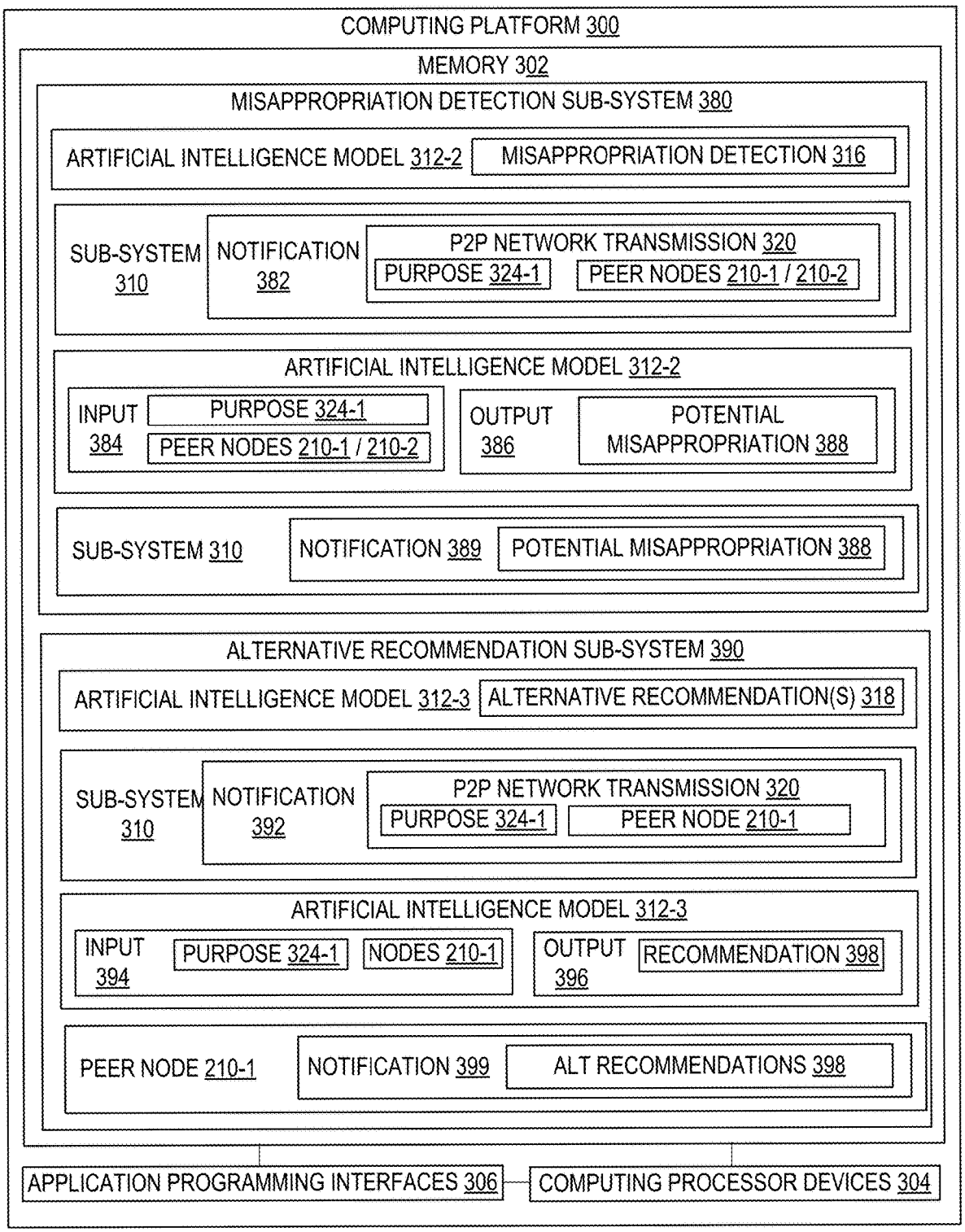
Figure 5:
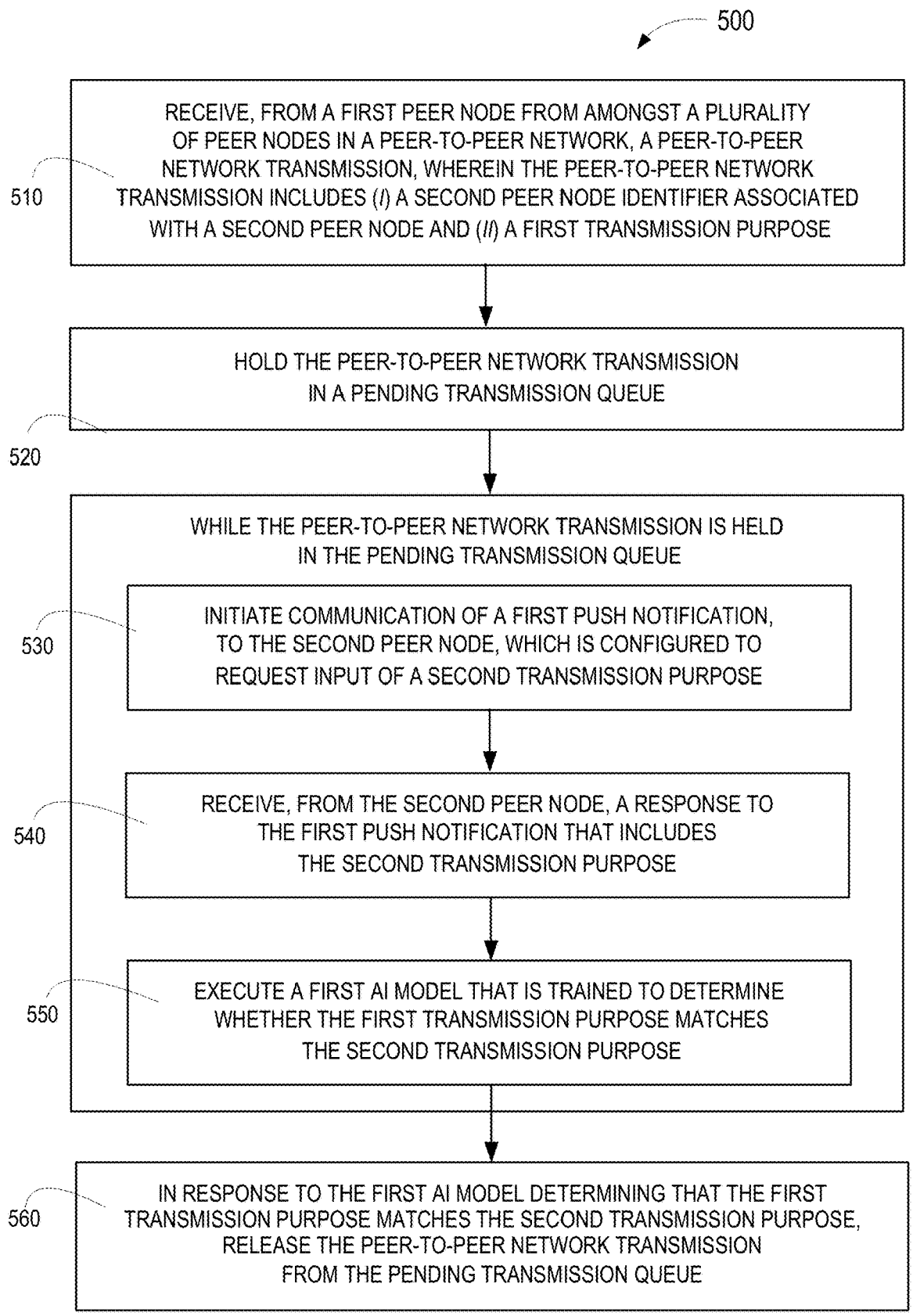

Having thus described embodiments of the disclosure in general terms, reference will now be made to the accompanying drawings, wherein:

FIG. 1 is a schematic/block diagram of a system for peer-to-peer network transmission verification, in accordance with embodiments of the present invention;

FIG. 2 is a block diagram of a computing platform including a peer-to-peer network transmission verification sub-system, in accordance with alternate embodiments of the present invention;

FIG. 3 is a block of a computing platform including a peer-to-peer network transmission verification sub-system configured for secondary/back-up verification, in accordance with embodiments of the invention;

FIG. 4 is a block of a computing platform including a misappropriation detection sub-system and an alternative recommendation sub-system, in accordance with embodiments of the invention; and FIG. 5 is a flow diagram of a method for peer-to-peer network transmission verification, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, a.), or an embodiment combining software and hardware aspects that may be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as JAVA, PERL, SMALLTALK, C++, PYTHON, or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

"Computing platform" or "computing device" as used herein refers to a networked computing device within the computing system. The computing platform may include a processor, a non-transitory storage medium (i.e., memory), a communications device, and a display. The computing platform may be configured to support user logins and inputs from any combination of similar or disparate devices. Accordingly, the computing platform includes servers, personal desktop computer, laptop computers, mobile computing devices and the like.

Thus, systems, apparatus, and methods are described in detail below that provide for verifying that the recipient entity/peer in a peer-to-peer network transmission is, in fact, the sending entity's/peer's intended recipient entity/peer. Verification occurs by implementing a process whereby the purpose/intent of the peer-to-peer network transmission as defined by the sending entity/peer must match the purpose/intent of the peer-to-peer network transmission as defined by the recipient entity/peer in order for the transmission to go through (i.e., process, such that, the recipient entity/peer receives the benefit of the transmission (e.g., resource exchange or the like)). In this regard, the verification system of the present invention operates under the assumption that when a sending peer sends a transmission the recipient peer knows, ahead of time, the purpose/intent of the transmission (i.e., the purpose/intent of the benefit realized by the peer-t-o-peer network transmission).

Specifically, the sending entity/peer initiates communication of a peer-to-peer network transmission, which identifies, among other parameters, the recipient entity/peer and purpose/intent of the transmission. The peer-to-peer network transmission is captured and held in a transmission pending queue until the recipient entity/peer can verify that they are the intended recipient of the transmission. In this regard, a push notification is communicated to the recipient entity/peer identified in the transmission, which requests input of their perceived purpose/intent of the transmission. Once the recipient entity/peer identified in the transmission responds with their purpose/intent of the transmission an Artificial Intelligence (AI) model trained to determined matches between inputted purposes/intents is executed to determine whether the sending peer's purpose/intent of the transmission matches the recipient peer's purpose intent. In the event that the AI model determines a purpose/intent match, the transmission is released for the transmission pending queue, so that further communication and/or processing of the transmission occurs (i.e., the recipient receives the benefit of the transmission, such as resource exchange or the like).

In conventional peer-to-peer network transmissions the sending peer often represents the purpose/intent of a transmission with symbols (e.g., emojis or the like), video file(s), avatar(s), audio file(s), multimedia file(s), personal identifying data alone, in combination with each other or in combination with textual/word inputs. Thus, in specific embodiments of the invention, the AI model is trained to determine matches between inputted purposes/intents, which may be represented by text, symbols video file(s), avatar(s), audio file(s), multimedia file(s), personal identifying data either alone or in combination with each other. (i.e., the AI model can determine matches based on any combination of inputs including, but not limited to, text, symbols, video file(s), avatar(s), audio file(s), multimedia file(s), personal identifying data alone, in combination with each other or in combination with textual/word inputs.).

In specific embodiments of the invention, in the event that the AI model does not determine a purpose/intent match, the transmission may be deleted/dropped from the transmission pending queue and a notification sent to the sending peer indicating the failure of the transmission. In other embodiments of the invention, in the event that the AI model does not determine a purpose/intent match, a secondary/back-up verification process may be implemented, such as verification through generation and presentation of a unique one-time verification code or the like.

In further specific embodiments of the invention, in addition to recipient peer verification, the sending peer's defined intent/purpose and, in some embodiments, the controlling party/user of the sending and/or recipient peer may be used for other objectives. For example, further AI models may be implemented that are trained to detect potential misappropriation as a result of the transmission based on the sending peer's defined intent/purpose and, in some embodiments, the controlling party/user of the sending and/or recipient peer. In specific embodiments of the invention, such AI models may be implemented while the transmission is held in the transmission pending queue, such that detection of potential misappropriation results in either (i) maintaining the transmission in the queue (even if verification has occurred) until further investigation can occur to confirm/deny the misappropriation or (ii) deleting/dropping the transmission from the transmission pending queue. In another example, further AI models may be implemented that are trained to detect alternative recommendations to sending the transmission (e.g., other ways the benefit of the transmission can be realized) based on the sending peer's defined intent/purpose and, in some embodiments, the controlling party/user of the sending and/or recipient peer. In specific embodiments of the invention, such AI models may be implemented while the transmission is held in the transmission pending queue, such that identification of alternative recommendations results in notification of the sending peer of the alternative recommendations for purposes of allowing the sending peer the option to revoke the transmission and proceed with one of the alternative recommendations.

Referring to FIG. 1, a schematic/block diagram is presented of an exemplary system 100 for peer-to-peer (P2P) network transmission verification, in accordance with embodiments of the present invention. The system includes a peer-to-peer (P2P network 200, which as used herein includes a person-to-person network. The P2P network 200 is a decentralized computing network architecture comprising a plurality of peer nodes 210 (i.e., computing devices, which may be mobile devices (e.g., smart phones), laptops, PCs or the like). Each peer node having equal privileges and responsibilities.

System 100 additionally includes a computing platform 300 having a memory 302 and one or more computing processor devices 304 in communication with the memory 302. As shown in FIG. 1, computing platform 300 may comprise multiple computing devices, such as servers/storage units and the like. Memory 302 stores P2P network transmission verification sub-system 310 that is executable by one or more of the computing processor devices 304 and includes one or more Artificial Intelligence models 312. P2P network transmission verification sub-system 310 is configured to receive a P2P network transmission 320 sent by a sending peer node 210 (e.g., first peer node 210). In specific embodiments of the system, P2P network transmission 320 may be a P2P network resource exchange (e.g., payment) from one peer node 210 (i.e., first peer node) to another peer node (i.e., second peer node) in the network 200. At a minimum, the P2P network transmission 320 includes (i) peer node identifier 322 associated with a peer node 210 in the network 200 and (ii) a transmission purpose 324-1 or intent as defined by the user/party in control of the sending peer node 210. For example, the peer node identifier 322 may be a telephone number or other device identifier associated with the recipient peer node (i.e., second peer node, which receives a benefit from the transmission 320, such as resources or the like). The transmission purpose 324-1 of the transmission 320 is inputted by the user/party in control of the sending peer node and defines the reason for which the transmission is being communicated (e.g., the purpose/reason for the resource exchange or the like).

In response to receiving P2P network transmission 320, P2P network transmission verification sub-system 310 is configured to hold the P2P network transmission 320 in a pending queue 330 until the P2P network transmission 320 has been verified (or otherwise, determined to be unverifiable). While the P2P network transmission 320 is in the pending queue 330, P2P network transmission verification sub-system 310 is configured to (i) initiate communication of a push notification 340, to the recipient peer node 210 (based on the peer node identifier 322 in the transmission 320), which is configured to request 342 input of the transmission purpose 324 and, in response (ii) receive a response 344 from the recipient peer node 210 that includes the transmission purpose 324-2 as defined by the user/party in control of the recipient peer node 210.

While the P2P network transmission 320 is in the pending queue 330, P2P network transmission verification sub-system 310 is configured to execute the AI model 312, which has been trained to determine matches between the transmission purpose 324-1 received as defined by the first peer node 210 and received in the transmission 320 and the transmission purpose 324-2 defined by the second peer node 210 and received in the request response 344. The AI model 312 is implemented because the invention takes into account the fact that the two defined transmission purposes 324 are unlikely to exactly match in terms of textual inputs (or in some embodiments in terms of symbols, video file(s), avatar(s), audio file(s), multimedia file(s), personal identifying data or the like) and, therefore, the AI model 312 is able to determine if the defined transmission purposes 324 are equivalent in terms of intent/purpose.

In response to the AI model 312 resulting in a purpose match determination 350, P2P network transmission verification sub-system 310 is configured to release the P2P network transmission 320 from the pending queue 330, such that the transmission 320 is capable of further processing including providing a benefit to the user of the second peer node 210 (e.g., immediate exchange of resource (real-time payment) from the first peer node 210 to the second peer node 210).

Referring to FIGS. 2-4, block diagrams are depicted of computing platform 300 highlighting various alternate embodiments of the P2P network transmission verification sub-system 310, in accordance with embodiments of the present invention. As previously discussed in relation to FIG. 1, computing platform 300 may comprise one or multiple computing devices, such as servers, storage devices or the like. As further previously discussed, computing platform 300 includes memory 302, which may comprise volatile and/or non-volatile memory, such as read-only memory (ROM) and/or random-access memory (RAM), EPROM, EEPROM, flash cards, or any memory common to computing platforms. Moreover, memory 302 may comprise cloud storage, such as provided by a cloud storage service and/or a cloud connection service.

Further, computing platform 300 includes one or more computing processor devices 304, which may be an application-specific integrated circuit ("ASIC"), or other chipset, logic circuit, or other data processing device. Computing processor device(s) 304 may execute one or more application programming interface (APIs) 306 that interface with any resident programs, such as P2P network transmission verification sub-system 310, misappropriation detection sub-system 380 (discussed infra. in relation to FIG. 4), alternative recommendation sub-system 390 (discussed infra. in relation to FIG. 4) or the like, stored in memory 302 of computing platform 300 and any external programs. Computing platform 300 may include various processing sub-systems (not shown in FIGS. 2-4) embodied in hardware, firmware, software, and combinations thereof, that enable the functionality of computing platform 300 and the operability of computing platform 300 on a distributed communication network (not shown in FIGS. 2-4). For example, processing sub-systems allow for initiating and maintaining communications and exchanging data with other networked devices. For the disclosed aspects, processing sub-systems of computing platform 300 may include any processing sub-system portion used in conjunction with P2P network transmission verification sub-system 310, misappropriation detection sub-system 380, alternative recommendation sub-system 390 and related tools, routines, sub-routines, applications, sub-applications, sub-modules thereof.

In specific embodiments of the present invention, computing platform 300 additionally includes a communications module (not shown in FIGS. 2-4) embodied in hardware, firmware, software, and combinations thereof, that enables electronic communications between components of computing platform 300 and other networks and network devices. Thus, communication module may include the requisite hardware, firmware, software and/or combinations thereof for establishing and maintaining a network communication connection with one or more devices and/or networks.

As previously discussed in relation to FIG. 1, memory 310 of computing platform 300 stores P2P network transmission verification sub-system 310, which is executable by one or more computing processing devices 3104 and includes AI model 312-1 that is trained to determine/detect purpose/intent matching 314. P2P network transmission verification sub-system 310 is configured to receive a P2P network transmission 320 sent by a sending peer node 210 (e.g., first peer node 210). In specific embodiments of the system, P2P network transmission 320 may be a P2P network resource exchange (e.g., payment) from one peer node 210 (i.e., first peer node) to another peer node (i.e., second peer node) in the network 200. At a minimum, the P2P network transmission 320 includes (i) peer node identifier 322 associated with a peer node 210-2 in the network 200 and (ii) a transmission purpose 324-1 or intent as defined by the user/party in control of the sending peer node 210-1. For example, the peer node identifier 322 may be a telephone number or other device identifier associated with the recipient peer node (i.e., second peer node, which receives a benefit from the transmission 320, such as resources or the like). The transmission purpose 324-1 of the transmission 320 is inputted by the user/party in control of the sending peer node and defines the reason for which the transmission is being communicated (e.g., the purpose/reason for the resource exchange or the like). Further, the transmission purpose 324-1 in the P2P network transmission 320 may be represented as textual 326 (i.e., words) and/or symbols/images 328 (e.g., emojis or the like) or other forms 329, such as video file(s), avatar(s), audio file(s), multimedia file(s), personal identifying data or the like.

In response to receiving P2P network transmission 320, P2P network transmission verification sub-system 310 is configured to hold the P2P network transmission 320 in a pending queue 330 until the P2P network transmission 320 has been verified (or otherwise, determined to be unverifiable). While the P2P network transmission 320 is in the pending queue 330, P2P network transmission verification sub-system 310 is configured to (i) initiate communication of a push notification 340, to the recipient peer node 210 (based on the peer node identifier 322 in the transmission 320), which is configured to request 342 input of the transmission purpose 324 and, in response (ii) receive a response 344 from the recipient peer node 210 that includes the transmission purpose 324-2 as defined by the user/party in control of the recipient peer node 210. Similar to the transmission purpose 324-1 in the P2P network transmission 320, the transmission purpose 324-2 in the P2P network transmission 320 may be represented as textual 326 (i.e., words) and/or symbols/images 328 (e.g., emojis or the like) and/or other forms, such as video file(s), avatar(s), audio file(s), multimedia file(s), personal identifying data or the like.

While the P2P network transmission 320 is in the pending queue 330, P2P network transmission verification sub-system 310 is configured to execute the AI model 312-1, which has been trained to determine matches between the transmission purpose 324-1 received as defined by the first peer node 210 and received in the transmission 320 and the transmission purpose 324-2 defined by the second peer node 210 and received in the request response 344.

In specific embodiments of the invention, AI model 312-1 has been trained to identify matches between the transmission purpose 324-1 represented by either textual 326 and/or symbols/images 328 and/or other forms 329, such as video file(s), avatar(s), audio file(s), multimedia file(s), personal identifying data or the like. Thus, the AI model 312-1 can determine matches between different textual representations 326, different symbols/images 328, different other forms 329, and any combination of textual 326, symbols/images 328, and/or other forms 329 (e.g., video file(s), avatar(s), audio file(s), multimedia file(s), personal identifying data) and the like.

In response to the AI model 312 resulting in a purpose match determination 350, P2P network transmission verification sub-system 310 is configured to release the P2P network transmission 320 from the pending queue 330, such that the transmission 320 is capable of further processing including providing a benefit to the user of the second peer node 210 (e.g., immediate exchange of resource (real-time payment) from the first peer node 210 to the second peer node 210).

As shown in FIG. 3, in specific embodiments of the system, in response to the AI model 312-1 failing to determine a purpose match 360, P2P network transmission verification sub-system 310 is configured to delete/drop 362 the P2P network transmission 320 from the pending queue 330. In such related embodiments of the system, P2P network transmission verification sub-system 310 is configured to initiate communication of a push notification 362 to the sending peer node 210-1 that indicates transmission failure 366.

In other specific embodiments of the invention, P2P network transmission verification sub-system 310 is configured to generate a unique one-time-use only verification code 370-1, store the code 370-1 in memory 302 and initiate communication of (i) a first push notification 372 to trusted device controlled by the user/party in control of the second peer node 210-2 that includes a unique one-time-use only verification code 370-1 and (ii) a second push notification 374 that requests 376 input of the verification code 370.

In response to communicating the push notifications 372, 374 P2P network transmission verification sub-system 310 is configured to receive a response 376 from the second peer node 210-2 that includes the verification code 370-2 as inputted by the user/party in control of the second peer node 210-2. In response to receiving the response 376, P2P network transmission verification sub-system 310 is configured to determine whether the stored verification code 370-1 matches the verification code 370-2 in the response 376. In response to determining that the stored verification code 370-1 matches the verification code 370-2 in the response 376, P2P network transmission verification sub-system 310 is configured to release 356 the peer-to-peer network transmission 320 from the transmission pending queue 330, such that further processing of the P2P network transmission 330 is allowed/authorized to ensue.

As shown in FIG. 4, in further specific embodiments of the system 100, memory 302 of computing platform 300 includes misappropriation detection sub-system 380 that includes an Artificial Intelligence (AI) model 312-2 that is configured for misappropriation detection 316. Misappropriation detection sub-system 380 is configured to receive, from P2P network transmission verification sub-system 310, a notification 382 that indicates the P2P network transmission 320 and includes the transmission purpose 324 as defined by the sending peer node 210-1 and, in some embodiments of the invention, identifies the peer nodes 210-1 and 210-2, which provide insight into the user/party in control of the respective peer node 210.

In response to receiving the notification, misappropriation detection sub-system 380 is configured to execute the AI model 312-2, which is configured to receive input 384 comprising the purpose 324-1 and in some embodiments of the system 100, the user/party in control of the respective peer nodes 210-1, 210-2 to output 386 potential misappropriation 388 surrounding the transmission. For example, in those embodiments in which the transmission is a resource exchange (e.g., payment or the like), the purpose/intent 324-1 of the resource exchange, as well as the parties to the resource exchange may provide for the AI model 312-2 to determine potential misappropriation surrounding the resource exchange (e.g., payment).

In response to the AI model 312-2 identifying potential misappropriation 388, misappropriation detection sub-system 380 is configured to initiate communication of notification 389 to P2P network transmission verification sub-system 310 (or other parties of interest) that indicates the potential misappropriation 388, such that the P2P network transmission verification sub-system 310 can implement a rules engine or the like and choose to (i) authorize release of the P2P network transmission once verification occurs, (ii) maintain the hold on the P2P network transmission 320 (regardless of verification) pending further investigation/confirmation of the misappropriation 388 or (iii) delete/drop the P2P network transmission for the pending queue 330.

In other specific embodiments of the system 100, memory 302 of computing platform 300 includes alternative recommendation sub-system 390 that includes an Artificial Intelligence (AI) model 312-3 that is configured for determining alternative recommendations 318 for the P2P network transmission (e.g., alternative means for conducting the resource exchange/payment or the like). Alternative recommendation sub-system 380 is configured to receive, from P2P network transmission verification sub-system 310, a notification 392 that indicates the P2P network transmission 320 and includes the transmission purpose 324-1 as defined by the sending peer node 210-1 and, in some embodiments of the invention, identifies the peer nodes 210-1, which provide insight into the user/party in control of the sending peer node 210-1.

In response to receiving the notification, alternative recommendation sub-system 390 is configured to execute the AI model 312-3, which is configured to receive input 394 comprising the purpose 324-1 and in some embodiments of the system 100, the user/party in control of the sending peer node 210-1 to output 396 alternative recommendations 398 for the transmission 320. For example, in those embodiments in which the transmission is a resource exchange (e.g., payment or the like), the purpose/intent 324-1 of the resource exchange, as well as the sending party to the resource exchange may provide for the AI model 312-3 to determine alternative resources and or resource channels for conducting the resource exchange/payment.

In response to the AI model 312-3 identifying alternative recommendations 398, alternative recommendation sub-system 390 is configured to initiate communication of notification 389 to sending peer node 210-1 (or other parties of interest) that indicates the alternative recommendations 398.

Referring to FIG. 5, a flow diagram is depicted of a method 500 for verifying P2P network transmissions, in accordance with embodiments of the present invention. At Event 510, a P2P network transmission sent by a sending peer node (e.g., a first peer node) is received. In specific embodiments of the system, P2P network transmission may be a P2P network resource exchange (e.g., payment) from one peer node (i.e., first peer node) to another peer node (i.e., second peer node) in a P2P network. At a minimum, the P2P network transmission includes (i) peer node identifier associated with receiving peer node (e.g., second peer node) and (ii) a transmission purpose or intent as defined by the user/party in control of the sending peer node (e.g., first peer node). For example, the peer node identifier may be a telephone number or other device identifier associated with the recipient peer node (i.e., second peer node, which receives a benefit from the transmission, such as resources or the like). The transmission purpose is inputted by the user/party in control of the sending peer node and defines the reason for which the transmission is being communicated (e.g., the purpose/reason for the resource exchange or the like).

In response to receiving P2P network transmission, at Event 520, the P2P network transmission is held in a pending queue until the P2P network transmission has been verified (or otherwise, determined to be unverifiable). While the P2P network transmission is held in the pending queue, at Event 530, communication of a push notification is initiated, to the recipient peer node (based on the peer node identifier in the transmission), which is configured to request input of the transmission purpose. In response to communicating the push notification/request at Event 540, a response is received from the recipient peer node that includes the transmission purpose as defined by the user/party in control of the recipient peer node.

While the P2P network transmission is in the pending queue 330, at Event 540, an AI model is executed, which has been trained to determine matches between (a) the transmission purpose received as defined by the first peer node and received in the transmission and (b) the transmission purpose defined by the second peer node and received in the request response. The AI model is implemented because the invention takes into account the fact that the two defined transmission purposes are unlikely to exactly match in terms of textual inputs or, in some embodiments, in terms of symbols/images (e.g., emojis or the like) video file(s), avatar(s), audio file(s), multimedia file(s), personal identifying data and the like, therefore, the AI model is able to determine if the defined transmission purposes are equivalent in terms of intent/purpose.

In response to the AI model determining a match of the transmission purposes, at Event 560, the P2P network transmission is released from the pending queue, such that the transmission is capable of further processing including providing a benefit to the user of the second/recipient peer node (e.g., immediate exchange of resource (real-time payment) from the first peer node 210 to the second peer node 210).

Thus, as described in detail above, present embodiments of the invention include systems, methods, computer program products and/or the like that provide for verifying that the recipient peer, as defined by the sending peer, is, in fact, the intended recipient of the transmission and/or the benefit of the transmission. Verification occurs by implementing a process whereby the purpose/intent of the peer-to-peer network transmission as defined by the sending entity/peer must match the purpose/intent of the peer-to-peer network transmission as defined by the recipient entity/peer in order for the transmission to be released from a pending queue, such that further processing can ensue.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for verifying a peer-to-peer network transmission, the system comprising:
   a peer-to-peer computing network comprising a plurality of peer nodes; and
   a computing platform comprising a memory and one or more computing processor devices in communication with the memory, wherein the memory stores a peer-to-peer network transmission verification sub-system including a first Artificial Intelligence (AI) model, wherein the peer-to-peer network transmission verification sub-system is executable by at least one of the one or more computing processor devices and configured to:
      receive, from a first peer node from amongst the plurality of peer nodes, a peer-to-peer network transmission, wherein the peer-to-peer network transmission includes (i) a second peer node identifier associated with a second peer node from amongst the plurality of peer nodes and (ii) a first transmission purpose;
      hold the peer-to-peer network transmission in a pending transmission queue;
      while the peer-to-peer network transmission is held in the pending transmission queue:
         initiate communication of a first push notification to the second peer node, wherein the first push notification is configured to request input of a second transmission purpose;
         receive, from the second peer node, a response to the first push notification that includes the second transmission purpose;
         execute the first AI model that is trained to determine whether the first transmission purpose matches the second transmission purpose;
         determine, by the first AI model, that the first transmission purpose does not match the second transmission purpose;
         generate and store a verification code;
         initiate communication of a second push notification to the second peer node that includes the verification code;
         initiate communication of a third push notification to the second peer node, wherein the third push notification is configured to request input of the verification code;
         receive, from the second peer node, a response to the third push notification that includes an inputted verification code;
         determine whether the stored verification code matches the inputted verification code; and
         determine that the stored verification code matches the inputted verification code;
      release the peer-to-peer network transmission from the pending transmission queue;
   wherein the memory further stores a misappropriation detection sub-system including a second AI model, wherein the misappropriation detection sub-system is executable by at least one of the one or more computing processor devices and configured to:
      receive, from the peer-to-peer network transmission verification sub-system, a first notification that indicates that the peer-to-peer network transmission is being held in the pending transmission, wherein the first notification includes the first transmission purpose;
      execute the second AI model that is trained to determine a potential misappropriation associated with the peer-to-peer network transmission based on the first transmission purpose;
      determine the potential misappropriation; and
      initiate communication of second notification to the peer-to-peer network transmission verification sub-system, wherein the second notification indicates a potential misappropriation associated with the peer-to-peer network transmission.

2. The system of claim 1, wherein at least one of the first transmission purpose and the second transmission purpose are represented by one or more non-textual representations including one or more of a symbol, an image, a video file, an avatar, an audio file, a multimedia file, and personal identifying data.

3. The system of claim 2, wherein the first AI model is trained to determine one of (i) whether the first transmission purpose represented by the one or more non-textual representations matches the second transmission purpose represented by at least text, (ii) whether the first transmission purpose represented by at least text matches the second transmission purpose represented by the one or more non-textual representations and (iii) whether the whether the first transmission purpose represented by the one or more non-textual representations matches the second transmission purpose represented by the one or more non-textual representations.

4. The system of claim 1, wherein the peer-to-peer network transmission is further defined as a peer-to-peer network resource exchange between a resource provider in control of the first peer node and a resource receiver in control of the second peer node.

5. The system of claim 1, wherein the peer-to-peer network transmission verification sub-system is further configured to:
   in response to the first AI model determining that the first transmission purpose does not match the second transmission purpose, delete the peer-to-peer network transmission from the pending transmission queue.

6. The system of claim 5, wherein the peer-to-peer network transmission verification sub-system is further configured to:
   initiate communication of a second push notification to the first peer node, wherein the second push notification is configured to notify the first peer node of peer-to-peer network transmission failure.

7. The system of claim 1, wherein the misappropriation detection sub-system is further configured to:
receive the first notification, wherein the first notification further includes at least one of (i) a first peer node identifier and (ii) a second peer node identifier; and
execute the second AI model that is trained to determine a potential misappropriation associated with the peer-to-peer network transmission based further on at least one of the first peer node and the second peer node.

8. The system of claim 1, wherein the memory further stores an alternative recommendation sub-system including a second AI model, wherein the alternative recommendation sub-system is executable by at least one of the one or more computing processor devices and is configured to:
receive, from the peer-to-peer network transmission verification sub-system, a first notification that indicates that the peer-to-peer network transmission is being held in the pending transmission, wherein the first notification includes the first transmission purpose;
implement the second AI model that is trained to determine one or more recommendations for alternatively accomplishing the first transmission purpose absent the peer-to-peer network transmission;
in response to determining the one or more recommendations, initiate communication of a second notification to the first peer node, wherein the second notification is configured to indicate the one or more recommendations.

9. A computer-implemented method for verifying a peer-to-peer network transmission, the method comprising:
receiving, from a first peer node from amongst a plurality of peer nodes in a peer-to-peer network, a peer-to-peer network transmission, wherein the peer-to-peer network transmission includes (i) a second peer node identifier associated with a second peer node from amongst the plurality of peer nodes and (ii) a first transmission purpose;
holding the peer-to-peer network transmission in a pending transmission queue;
while the peer-to-peer network transmission is held in the pending transmission queue:
initiating communication of a first push notification to the second peer node, wherein the first push notification is configured to request input of a second transmission purpose;
receiving, from the second peer node, a response to the first push notification that includes the second transmission purpose;
executing a first AI model that is trained to determine whether the first transmission purpose matches the second transmission purpose;
determining, by the first AI model, that the first transmission purpose does not match the second transmission purpose;
generating and storing a verification code;
initiating communication of a second push notification to the second peer node that includes the verification code;
initiating communication of a third push notification to the second peer node, wherein the third push notification is configured to request input of the verification code;
receiving, from the second peer node, a response to the third push notification that includes an inputted verification code;
determining whether the stored verification code matches the inputted verification code;
determining that the stored verification code matches the inputted verification code;
releasing the peer-to-peer network transmission from the pending transmission queue;
storing a misappropriation detection sub-system including a second AI model, wherein the misappropriation detection sub-system is executable by at least one of the one or more computing processor devices and configured to:
receiving, from the peer-to-peer network transmission verification sub-system, a first notification that indicates that the peer-to-peer network transmission is being held in the pending transmission, wherein the first notification includes the first transmission purpose;
executing the second AI model that is trained to determine a potential misappropriation associated with the peer-to-peer network transmission based on the first transmission purpose; and
determining the potential misappropriation; and
initiating communication of second notification to the peer-to-peer network transmission verification sub-system, wherein the second notification indicates a potential misappropriation associated with the peer-to-peer network transmission.

10. The computer-implemented method of claim 9, wherein at least one of:
receiving the peer-to-peer network transmission, wherein the peer-to-peer network transmission includes the first transmission purpose represented in the peer-to-peer network transmission by one or more non-textual representations; and
receiving a response to the first push notification that includes the second transmission purpose represented in the response by of non-textual representations including one or more of a symbol, an image, a video file, an avatar, an audio file, a multimedia file, and personal identifying data.

11. The computer-implemented method of claim 10, wherein executing the first AI model that is trained to determine whether the first transmission purpose matches the second transmission purpose further comprises executing the first AI model that is trained to determine one of (i) whether the first transmission purpose represented by the one or more non-textual representations matches the second transmission purpose represented by at least text, (ii) whether the first transmission purpose represented by at least text matches the second transmission purpose represented by the one or more non-textual of representations and (iii) whether the whether the first transmission purpose represented by the one or more non-textual representations matches the second transmission purpose represented by the one or more non-textual representations.

12. The computer-implemented method of claim 9, further comprising:
executing a second AI model that is trained to determine a potential misappropriation associated with the peer-to-peer network transmission based on the first transmission purpose; and
in response to determining the potential misappropriation, maintaining the peer-to-peer network transmission in the pending transmission queue or deleting the peer-to-peer network transmission from the pending transmission queue.

13. A computer program product including a non-transitory computer-readable medium, the non-transitory computer-readable medium comprising sets of codes for causing one or more computing devices to receive, from a first peer node from amongst a plurality of peer nodes in a peer-to-peer network, a peer-to-peer network transmission, wherein the peer-to-peer network transmission includes (i) a second peer node identifier associated with a second peer node from amongst the plurality of peer nodes and (ii) a first transmission purpose;

hold the peer-to-peer network transmission in a pending transmission queue;

while the peer-to-peer network transmission is held in the pending transmission queue:

initiate communication of a first push notification to the second peer node, wherein the first push notification is configured to request input of a second transmission purpose;

receive, from the second peer node, a response to the first push notification that includes the second transmission purpose;

execute a first AI model that is trained to determine whether the first transmission purpose matches the second transmission purpose;

determine, by the first AI model, that the first transmission purpose does not match the second transmission purpose;

generate and storing a verification code;

initiate communication of a second push notification to the second peer node that includes the verification code;

initiate communication of a third push notification to the second peer node, wherein the third push notification is configured to request input of the verification code;

receive, from the second peer node, a response to the third push notification that includes an inputted verification code;

determine whether the stored verification code matches the inputted verification code;

determine that the stored verification code matches the inputted verification code;

release the peer-to-peer network transmission from the pending transmission queue;

store a misappropriation detection sub-system including a second AI model, wherein the misappropriation detection sub-system is executable by at least one of the one or more computing processor devices and configured to:

receive, from the peer-to-peer network transmission verification sub-system, a first notification that indicates that the peer-to-peer network transmission is being held in the pending transmission, wherein the first notification includes the first transmission purpose;

execute the second AI model that is trained to determine a potential misappropriation associated with the peer-to-peer network transmission based on the first transmission purpose; and determine the potential misappropriation; and initiate communication of second notification to the peer-to-peer network transmission verification sub-system, wherein the second notification indicates a potential misappropriation associated with the peer-to-peer network transmission.

14. The computer program product of claim 13, wherein at least one of:

the set of codes for causing the one or more computing devices to receive the peer-to-peer network transmission are further configured to cause the one or more computing devices to receive the peer-to-peer network transmission, wherein the peer-to-peer network transmission includes the first transmission purpose represented in the peer-to-peer network transmission by one or more non-textual representations; and the set of codes for causing the one or more computing devices to receive the response are further configured to cause the one or more computing devices to receive the response to the first push notification that includes the second transmission purpose represented in the response by one or more non-textual representations including one or more of a symbol, an image, a video file, an avatar, an audio file, a multimedia file, and personal identifying data.

15. The computer program product of claim 14, wherein the sets of codes for executing the first AI model are further configured to cause the one or more computing devices to execute the first AI model that is trained to determine one of (i) whether the first transmission purpose represented by the one or more non-textual representations matches the second transmission purpose represented by text, (ii) whether the first transmission purpose represented by text matches the second transmission purpose represented by the one or more non-textual representations and (iii) whether the whether the first transmission purpose represented by the one or more non-textual representations matches the second transmission purpose represented by the one or more non-textual representations.

16. The computer program product of claim 13, wherein the sets of codes further include sets of codes for causing the one or more computing device to:

execute a second AI model that is trained to determine a potential misappropriation associated with the peer-to-peer network transmission based on the first transmission purpose; and in response to determining the potential misappropriation, maintain the peer-to-peer network transmission in the pending transmission queue or delete the peer-to-peer network transmission from the pending transmission queue.

* * * * *